United States Patent

Chatelain et al.

[11] Patent Number: 5,516,998
[45] Date of Patent: May 14, 1996

[54] LASER BEAM MACHINING PROCESS AND APPARATUS

[75] Inventors: Hervé L. Chatelain, Lieusaint; Peter Herren, Bellmund; Peter Thompson, Grande Bretagne, all of France

[73] Assignee: Societe Nationale d'Etude et de Construction de Monteurs d'Aviation "SNECMA", Paris, France

[21] Appl. No.: 174,402

[22] Filed: Dec. 28, 1993

[30] Foreign Application Priority Data

Dec. 30, 1992 [FR] France ..................... 92 15885

[51] Int. Cl.⁶ .................................................. B23K 26/00
[52] U.S. Cl. .............................. 219/121.7; 219/121.67; 219/121.71; 219/121.85
[58] Field of Search ................ 219/121.11, 121.6, 219/121.67, 121.68, 121.69, 121.7, 121.71, 121.85

[56] References Cited

U.S. PATENT DOCUMENTS

| | | | |
|---|---|---|---|
| 4,873,414 | 10/1989 | Ma et al. | 219/121.7 |
| 5,140,127 | 8/1992 | Stroud et al. | 219/121.71 |
| 5,222,617 | 6/1993 | Gregory et al. | 219/121.71 |

Primary Examiner—Bruce A. Reynolds
Assistant Examiner—Tu Hoang
Attorney, Agent, or Firm—Oblon, Spivak, McClelland, Maier, & Neustadt

[57] ABSTRACT

A laser beam machining process and apparatus, applicable to laser beam perforation and cutting, in which a laser beam is directed onto a wall (4) of a component (6) to be machined from one side of the said wall and emerges on the other side thereof following the machining operation. According to the invention, a disk (16) which is opaque to the laser beam is placed on the other side of the wall on the path followed by the laser beam when it emerges and performs a rotary movement, so as to stop the emerging laser beam and in this way protect the walls (8) adjacent to the machined wall against the impacts of the emergent laser beam.

6 Claims, 1 Drawing Sheet

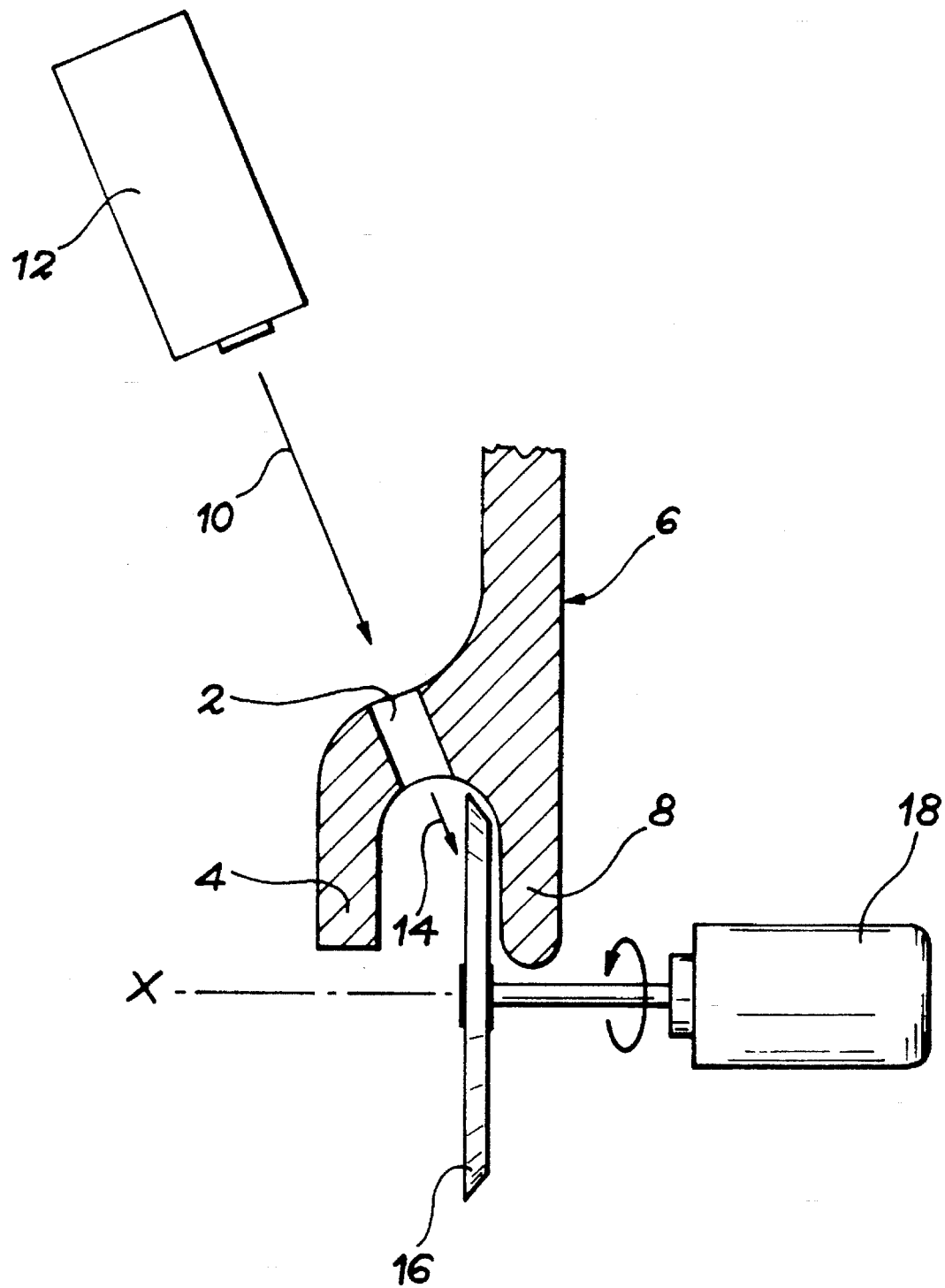

LASER BEAM MACHINING PROCESS AND APPARATUS

BACKGROUND OF THE INVENTION

1. Field of the Invention

The present invention relates to a process and an apparatus for machining by laser beam. It more particularly applies to the perforation and cutting of mechanical parts.

2. Discussion of Background

During the machining, e.g. perforation, of a wall of a part by a laser beam, there is a risk of the latter damaging the walls of the part and which are adjacent to the preceding wall, after perforating the latter.

EP-A-347,053 already discloses a method making it possible to prevent any damage to adjacent walls by the laser beam. This known method consists of placing in the vicinity of the point where the laser beam emerges after perforating the said wall, a thixotropic agent incorporating a material able to disperse the laser beam.

However, this known method suffers from the disadvantage of requiring the cleaning of the part after its machining, in order to eliminate the said thixotropic medium.

SUMMARY OF THE INVENTION

The present invention is directed at a laser beam machining process and apparatus making it possible to protect walls adjacent to the machined wall against the impacts of the laser beam, but without suffering from the disadvantage referred to hereinbefore.

More specifically, the present invention firstly relates to a laser beam machining process, in which the laser beam is directed onto a wall of a component to be machined from one side of said wall and emerges on the other side thereof after machining, the process being characterized in that a disk opaque to the laser beam is placed on the other side of the wall on the path followed by the laser beam when it emerges and performs a rotary movement, so as to stop the emergent laser beam and in this way protect walls adjacent to the machined wall against the impacts of the emergent laser beam.

The present invention also relates to a laser beam machining apparatus incorporating means for creating the laser beam and directing it onto a wall of a component to be machined from one side of the wall, the laser beam emerging on the other side of the wall after machining, the apparatus being characterized in that it also comprises a disk which is opaque to the laser beam and which is to be positioned on the other side of the wall on the path followed by the laser beam when it emerges, and means for rotating the disk so as to stop the emergent laser beam and thus protect walls adjacent to the machined wall against impacts of the emergent laser beam.

BRIEF DESCRIPTION OF THE DRAWINGS

The invention is described in greater detail hereinafter relative to non-limitative embodiments and with reference to the single diagrammatic drawing showing a machining apparatus according to the invention.

DESCRIPTION OF THE PREFERRED EMBODIMENTS

In the embodiment illustrated by the drawing, the apparatus according to the invention is intended to make an opening 2 in a wall 4 of a part 6, which is held by not shown means. The part 6 has other walls such as the wall 8, which are adjacent to the wall 4 in which the perforation is made. The perforation is made by means of a laser beam 10 formed by known means 12 having an e.g. YAG-type laser.

In order to protect the adjacent wall 8 against a secondary impact of the laser beam, i.e. against the laser beam 14 emerging from the wall 4 when the opening 2 has been made, according to the present invention, use is made of a disk 16 for stopping the emergent laser beam 14.

This protective disk 16 performs a rotary movement about its axis X by means of a motor 18 maintained and controlled by not shown means.

The disk 16, which has no openings and which is opaque to the laser beam, is positioned, prior to the perforating operation, between the walls 4 and 8 in the vicinity of the wall 8 to be protected and so as to intersect the laser beam when the latter emerges from the perforated wall 4.

The rotation of the disk 16 when the perforating operation takes place consequently makes it possible to stop the beam when it emerges from the wall 4 and distribute the power of the laser beam over a large surface and consequently reduce the energy density on the material forming the disk 16.

The nature and dimensions of this disk, as well as its rotation speed are chosen as a function of the machining operation to be performed (shape of the part, necessary laser beam power, etc.).

It is e.g. possible to choose the constituent material of the disk from within the group including polytetrafluoroethylene (PTFE), aluminium, copper, molybdenum, tungsten carbide, martensitic stainless steel, austenitic stainless steel, nickel-based alloys, cobalt-based alloys and titanium, although this list is not exhaustive.

The disk will preferably be given a thickness equal to or greater than 0.4 mm (but obviously smaller than the distance separating the wall 4 to be machined from the wall 8 which it is wished to protect).

As a function of the machining conditions and more particularly the diameter of the laser beam, it is possible to give the disk 16 a diameter in the range 10 and 80 mm.

The rotation speed of the disk 16 is also chosen as a function of the machining conditions and in particular the power of the laser beam and can be chosen in the range 10,000 to 100,000 revolutions per minute.

The present invention offers many advantages.

In particular, it makes it possible to use disks made from various materials and with a very limited thickness (which would not resist the laser beam if said disks were stationary). It is even possible to use a disk of the same nature as the part to be machined.

The present invention also makes it possible to stop the laser beam in very narrow cavities (by adapting the disk dimensions to said cavities).

Finally, it is possible to adapt the disk to the configuration of the part to be machined.

We claim:

1. Process for machining by laser beam, according to which the laser beam is directed onto a wall of a component to be machined from one side of said wall and emerges on the other side thereof after machining, said process being characterized in that a disk opaque to the laser beam is placed on said other side of the wall on a path followed by the laser beam when said laser beam emerges and is given a rotary movement, so as to stop an emergent laser beam which emerges from the wall to be machined and thus protect a wall located adjacent to the machined wall against impingement of said emergent laser beam.

2. Apparatus for machining by laser beam, comprising:

means for creating the laser beam and directing it onto a wall of a component to be machined from one side of said wall, the laser beam emerging from the other side of said wall after machining, a disk opaque to the laser beam and placed on said other side of the wall on a path followed by the laser beam when the laser beam emerges from the wall being machined, and means for rotating the disk, so as to stop an emergent laser beam which emerges from the wall being machined and thus protect a wall located adjacent to the machined wall against impingement of the emergent laser beam.

3. Apparatus according to claim 2, wherein the disk has a rotation speed in the range 10,000 to 100,000 revolutions per minute.

4. Apparatus according to claim 2, wherein the disk has a diameter in the range 10 to 80 mm.

5. Apparatus according to claim 2, wherein the disk has a thickness at least equal to 0.4 mm.

6. Apparatus according to claim 2, wherein the disk is made form a material chosen from the group consisting of polytetrafluoroethylene, aluminum, copper, molybdenum, tungsten carbide, martensitic stainless steel, austenitic stainless steel, nickel-based alloys, cobalt-based alloys, titanium and a constituent material of the wall to be machined.

* * * * *